United States Patent
Chung

(10) Patent No.: US 10,027,966 B2
(45) Date of Patent: Jul. 17, 2018

(54) APPARATUS AND METHOD FOR COMPRESSING PICTURES WITH ROI-DEPENDENT COMPRESSION PARAMETERS

(75) Inventor: Chul Chung, Seoul (KR)

(73) Assignee: MONDO SYSTEMS, INC., Seoul (KR)

( * ) Notice: Subject to any disclaimer, the term of this patent is extended or adjusted under 35 U.S.C. 154(b) by 874 days.

(21) Appl. No.: 12/711,164

(22) Filed: Feb. 23, 2010

(65) Prior Publication Data

US 2010/0215098 A1 Aug. 26, 2010

(30) Foreign Application Priority Data

Feb. 23, 2009 (KR) ................. 10-2009-0014840

(51) Int. Cl.
| | |
|---|---|
| H04N 19/20 | (2014.01) |
| H04N 19/115 | (2014.01) |
| H04N 19/124 | (2014.01) |
| H04N 19/136 | (2014.01) |
| H04N 19/17 | (2014.01) |

(52) U.S. Cl.
CPC ........... *H04N 19/20* (2014.11); *H04N 19/115* (2014.11); *H04N 19/124* (2014.11); *H04N 19/136* (2014.11); *H04N 19/17* (2014.11)

(58) Field of Classification Search
CPC .. H04N 19/115; H04N 19/124; H04N 19/136; H04N 19/17; H04N 19/20
USPC .................................................. 375/240.08
See application file for complete search history.

(56) References Cited

U.S. PATENT DOCUMENTS

| | | | |
|---|---|---|---|
| 6,212,302 B1 | 4/2001 | Honsinger et al. | |
| 6,654,417 B1 | 11/2003 | Hui | |
| 8,135,061 B1 | 3/2012 | Ganesan et al. | |
| 2003/0123751 A1* | 7/2003 | Krishnamurthy et al. | ... 382/282 |
| 2005/0018881 A1 | 1/2005 | Peker et al. | |
| 2006/0002631 A1* | 1/2006 | Fu et al. | ........................ 382/294 |
| 2006/0083428 A1* | 4/2006 | Ghosh | .................... B60R 13/10 |
| | | | 382/224 |

(Continued)

OTHER PUBLICATIONS

L. Itti, C. Koch, and E. Niebur, "A Model of Saliency-Based Visual Attention for Rapid Scene Analysis", IEEE Transactions on Pattern Analysis and Machine Intelligence, vol. 20, No. 11, Nov. 1998, pp. 1254-1259.

(Continued)

*Primary Examiner* — Anner N Holder
(74) *Attorney, Agent, or Firm* — H.C. Park & Associates, PLC

(57) ABSTRACT

An apparatus and method to decrease bit rate through direct control of video compression parameters when compressing a video. The video compressing apparatus may use a Region of Interest (ROI)-dependent compression parameter and may include a ROI estimating part, a parameter allocating part, and a compression part. The ROI estimating part may estimate the ROI of an input video. The parameter allocating part may allocate a compression parameter to each region of the input video based on the estimated ROI information. The compression part may compress the input video by applying the parameter allocated to each region. A higher compression rate may be achieved by allocating a higher bit rate to the ROI and a lower bit rate to non-ROI regions.

13 Claims, 7 Drawing Sheets

(56) References Cited

U.S. PATENT DOCUMENTS

| | | | |
|---|---|---|---|
| 2006/0139497 A1 | 6/2006 | Caviedes | |
| 2010/0045800 A1* | 2/2010 | Chebil | G03B 13/36 348/169 |
| 2010/0091330 A1* | 4/2010 | Marchesotti | G06K 9/4676 358/1.18 |
| 2010/0172404 A1* | 7/2010 | Isnardi | H04N 19/61 375/240.01 |
| 2010/0183070 A1* | 7/2010 | Lu | H04N 19/61 375/240.08 |
| 2010/0226564 A1* | 9/2010 | Marchesotti | G06F 17/30256 382/159 |

OTHER PUBLICATIONS

W. Cheng, W. Chu, J. Kuo, and J. Wu, "Automatic video region-of-interest determination based on user attention model", 2005 IEEE International Symposium on Circuits and Systems, vol. 4, Issue 23-26, May 2005, pp. 3219-3222.

O. Komogortsev, and J. Khan, "Perceptual attention focus prediction for multiple viewers in case of multimedia perceptual compression with feedback delay", Proceedings of the 2006 Symposium on Eye Tracking Research & Amp, 2006, pp. 101-108.

G. Boccignone, A. Marcelli, and G. Somma, "Foveated Analysis of Video," Proceedings of the 12th International Conference on Image Analysis and Processing (ICIAP'03), 2003, pp. 638.

Final Office Action dated Sep. 24, 2012, in U.S. Appl. No. 12/483,068.

\* cited by examiner

APPARATUS AND METHOD FOR COMPRESSING PICTURES WITH ROI-DEPENDENT COMPRESSION PARAMETERS

CROSS REFERENCE TO RELATED APPLICATION

This application claims priority from and the benefit of Korean Patent Application No. 10-2009-0014840, filed on Feb. 23, 2009, which is hereby incorporated by reference for all purposes as if fully set forth herein.

BACKGROUND OF THE INVENTION

Field of the Invention

Exemplary embodiments of the present invention relate to an apparatus and method for compressing a video.

Discussion of the Background

Methods of compressing moving pictures (i.e., video) generally aim at increasing a compression rate and improving video quality while maintaining the same bit rate by, in some cases, using a human visual system (HVS). An example of a video compression method is the Moving Pictures Expert Group (MPEG) method. Existing compression methods, such as the MPEG, provide significant decreases in data volume through chroma subsampling by utilizing a human being's reduced insensitivity to color, as opposed to brightness.

Other video compression methods may use foveated video coding. Foveation occurs when a resolution at a point (i.e., fixation point) in an image/video is different than a resolution at other points in the image/video. For example, an average human may only clearly see about 2 degrees around a fixation point and other portions may not be seen clearly. Foveated video coding provides an improved compression rate by estimating the fixation point of a video and impairing portions of the video located remotely from the fixation point. This method takes advantage of the fact that human visual resolution diminishes further from the fixation point.

Blurring is one example of a foveation method. Examples of blurring include filtering, multiresolution & wavelet-related techniques, and sub-band suppression in Discrete Cosine Transform (DCT) domain. Compression methods based on DCT, which is used by most video compression standards, utilize a blur filter in the DCT domain. Blurring techniques are widely used because their compression efficiencies are good.

However, foveation methods have certain limitations because the foveation methods may blur an image/video without affecting and/or adjusting the bit rate. In addition, in some cases, even if foveated video coding is applied to the video, the desired compression effect may not be achieved. For example, when a game character (e.g., fighter 1) is standing close to a rope at the corner of a ring in a game screen, and the fixation point is situated at a face of another character (e.g., fighter 2) in the center of the ring, blurring may be used to compress the video by blurring points in the video away from fighter 2's face; however, the bit rate of the video may is still not be affected.

SUMMARY OF THE INVENTION

Exemplary embodiments of the present invention provide an apparatus and method for compressing a video, and in particular, an apparatus and method for compressing a video to improve video quality by decreasing a bit rate through direct control of a video compression parameter.

Additional features of the invention will be set forth in the description which follows, and in part will be apparent from the description, or may be learned by practice of the invention.

Exemplary embodiments of the present invention disclose an apparatus to compress a video. The apparatus comprises a ROI estimating part, a parameter allocating part, and a compression part. The ROI estimating part estimates ROI information associated with a first ROI in the video. The parameter allocating part allocates a first compression parameter to the first ROI in the video based on the ROI information. The compression part compresses the video by applying the first compression parameter allocated to the first ROI.

Exemplary embodiments of the present invention disclose a method to compress a video. The method comprises estimating region of interest (ROI) information associated with a first ROI of the video, allocating a compression parameter to the first ROI of the video based on the ROI information, and compressing the video by applying the compression parameter allocated to the first ROI.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
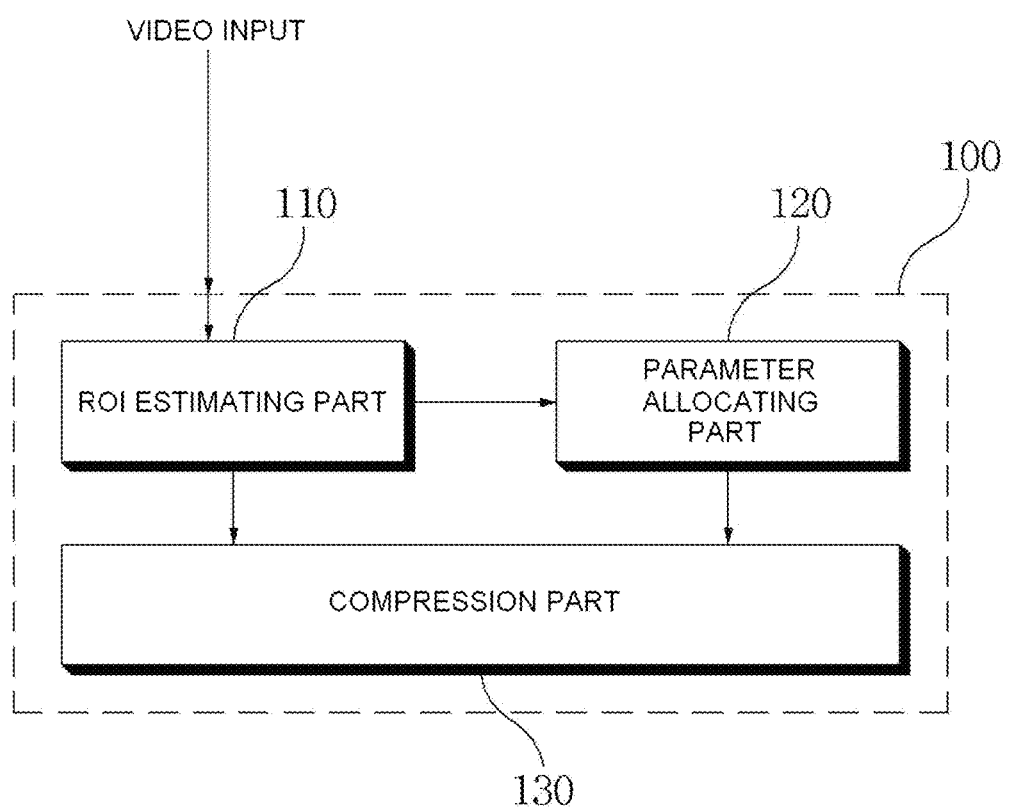
FIG. 1 illustrates a block diagram of a video compression apparatus according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Hereinafter, exemplary embodiments of the present invention are described in detail with reference to the accompanying drawings.

FIG. 1 illustrates a block diagram of a video compression apparatus 100 according to exemplary embodiments of the present invention. The video compression apparatus 100 may receive a video as an input and may compress the input video. The video compression apparatus 100 may include a Region(s) of Interest (ROI) estimating part 110, a parameter allocating part 120, and a compression part 130. The ROI estimating part 110 may estimate the ROI of the input video. The parameter allocating part 120 may allocate a compression parameter to each region of the input video input according to ROI information based on the ROI estimated by the ROI estimating part 110. The compression part 130 may compress the input video using the compression parameter allocated by the parameter allocating part 120.

The ROI estimating part 110 may estimate the ROI of input video. ROI may refer to one or more regions in the input video to which a viewer of the input video may pay more attention. For example, when a person appears in a video, a region in the video showing the person may be designated as the ROI. In addition, if a caption appears in a video, the caption may also be designated as a ROI. Thus, in some cases, a person and/or caption can be detected automatically and the associated regions can be estimated as the ROI.

A ROI can be estimated by analyzing the input video using any suitable method, such as, for example, a ROI estimating algorithm. In some cases, the ROI estimating algorithm may estimate the ROI automatically and may be used in a real-time video transmitting system (e.g., a video phone system). In other cases, for example, when a video may not need to be transmitted in real-time, an ROI can be determined after thorough and complete analysis of the input video. For example, while compressing a video to be transmitted in an Internet Protocol Television (IPTV) system, an ROI may be determined after measuring eye movement of multiple people watching the video before video transmission. Examples of suitable methods to estimate the ROI can be found in the following publications.

1) L. Itti, C. Koch, and E. Niebur, "A Model of Saliency-Based Visual Attention for Rapid Scene Analysis," *IEEE Transactions on Pattern Analysis and Machine Intelligence*, Vol. 20, No. 11, November 1998, pp. 1254-1259.

2) W. Cheng, W. Chu, J. Kuo, and J. Wu, "Automatic video region-of-interest determination based on user attention model," 2005 *IEEE International Symposium on Circuits and Systems*, Volume 4, Issue 23-26, May 2005, pp. 3219-3222.

3) G. Boccignone, A. Marcelli, and G. Somma, "Foveated Analysis of Video," *Proceedings of the 12th International Conference on Image Analysis and Processing (ICIAP '03)*, 2003, pp. 638.

4) O. Komogortsev, and J. Khan, "Perceptual attention focus prediction for multiple viewers in case of multimedia perceptual compression with feedback delay," Proceedings of the 2006 Symposium on Eye Tracking Research & Amp, 2006, pp. 101-108.

Since ROI estimation methods are known to those of skill in the art, detailed is descriptions of the ROI estimation methods are not provided herein, but can be found, at least, in the above-noted references.

It should be understood that other ROI estimating methods may be used and that ROI estimating methods are not limited to those discussed in the noted references. For example, a center of the input video may be designated as a fixed ROI. Alternatively, a viewer may designate the ROI.

The ROI estimating part 110 may estimate the ROI of the input video and may provide the estimated ROI result in terms of a probability, for example, the probability that each pixel of the video belongs to an ROI. The estimated ROI result may include a probability that each macroblock of video belongs to a ROI, and/or identification of regions that have a relatively high probability of belonging to a ROI.

The parameter allocating part 120 may allocate a compression parameter to each region of the input video based on the ROI information provided by the ROI estimating part 110. For example, in some cases, a first ROI may be allocated a first compression parameter, and a second ROI may be allocated a second compression parameter. In some cases, a first non-ROI may be allocated a third compression parameter.

The compression parameter can be a bit rate, Quantization Parameter (QP), resolution, and/or an adjustable parameter of a video standard (e.g., MPEG-2, MPEG-4, H.264). The adjustable parameter of a video standard may include any parameter already defined as adjustable in the particular video standard.

For example, if the compression parameter is the bit rate, different bit rates can be allocated to ROI and non-ROI, respectively. For example, 1.2 Mbps of bit rate can be allocated to a ROI, and 200 Kbps of bit rate can be allocated to non-ROI.

In another example, using the H.264 video standard, a frame may be divided in multiple slices and/or blocks. The following adjustable parameters may be adjusted and allocated for each slice:

1) a direct_spatial_mv_pred_flag which may specify a method used in a decoding process used to derive motion vectors and reference indices in a B-slice;

2) slice_qp_delta which may specify an initial value of a QP that may be used for all macroblocks (groups of blocks) in a slice unless modified;

3) disable_deblocking_filter_idc which may specify whether a deblocking filter to filter portions of the slice may be used or not; and 4) a prediction weight table may provide weighted predictions or change in weighted predictions that specify use of a scaling and offset when performing motion compensation.

Different QPs may also be allocated to each macroblock. In the H.264 standard, for example, it is possible to control the QP for each macroblock by controlling a mb_qp_delta parameter.

When allocating a parameter to regions of the input video, a separate parameter can be designated per each region according to the compression method being used. In some cases, a resolution of each region can be changed by modifying the compression method being used.

The above compression parameters are only illustrative, and the parameter allocating part 120 is not restricted to them. It should be understood that various compression parameters may be used.

The compression part 130 may compress the input video using the parameter allocated to each region of the input video by the parameter allocating part 120. In some cases, the compression part 130 may be an encoder operating according to a particular video standard. For example, the compression part 130 may be a H.264 encoder, MPEG-4 encoder or MPEG-2 encoder, and may compress the input video accordingly. In general, any suitable encoder and/or compression algorithm may be used in the compression part 130.

Figure 2:
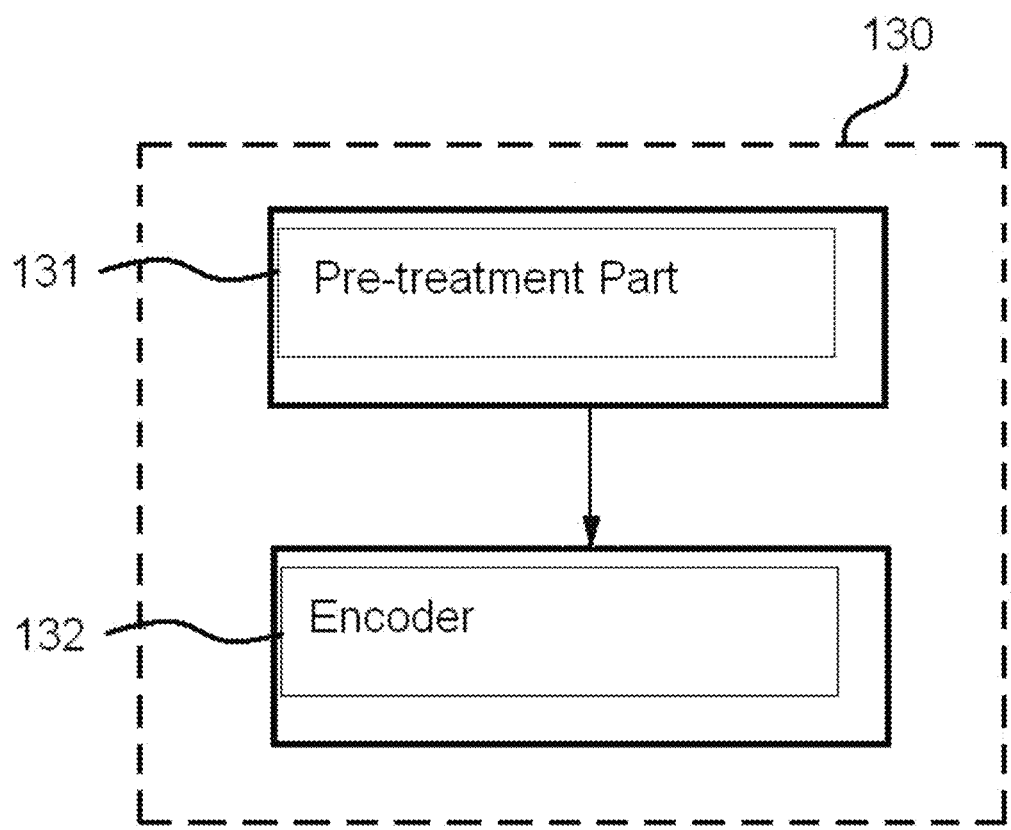
FIG. 2 is a block drawing indicating the detailed composition of the compression part shown in FIG. 1.

Referring to FIG. 2, the compression part 130 may include a pre-treatment part 131 and an encoder 132. The pre-treatment part 131 may perform pre-treatment of the input video before compressing the input video. Compression of the input video may then be performed by the encoder 132 after pre-treatment of the input video. In some cases, the compression part 130 may not include a pre-treatment part 131, since pre-treatment may be performed optionally. The pre-treatment performed by the pre-treatment part 131 may include blurring of the non-ROI, video sharpening of the ROI, or whole or partial change of a resolution of the input video. It should be understood that various other suitable pre-treating processes may be performed by the compression part 130 and that exemplary embodiments of the present invention are not restricted to a particular pre-treatment.

FIG. 3, FIG. 4, FIG. 5, and FIG. 6 illustrate examples of an input video compressed according to exemplary embodiments of the present invention.

Figure 3:
FIG. 3 illustrates an original picture taken from an input video before performing any compression according to exemplary embodiments of the present invention.

FIG. 3 illustrates an original picture taken from an input video before performing any compression.

Figure 4:
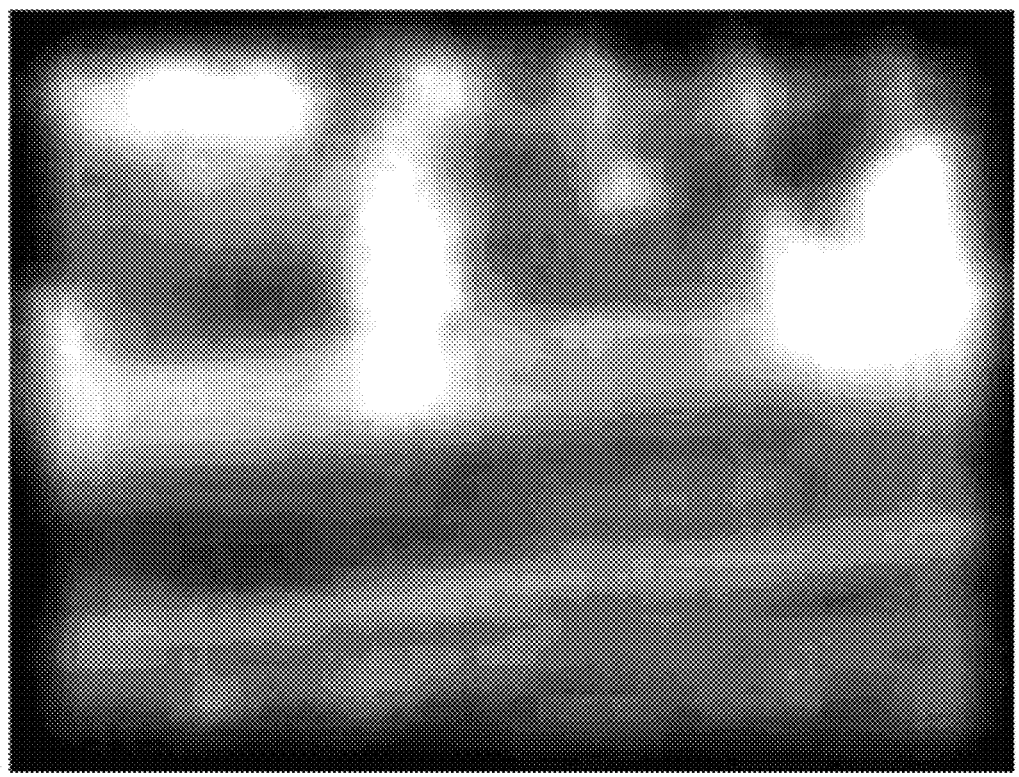
FIG. 4 illustrates an estimated ROI of the input video (picture) shown in FIG. 3 according to exemplary embodiments of the present invention.

FIG. 4 illustrates the estimated ROI of the input video (picture) shown in FIG. 3 according to exemplary embodiments of the present invention.

Figure 5:
FIG. 5 illustrates an example of a compressed input video (picture) based on the input video (picture) in FIG. 3 and the ROI indicated in FIG. 4 as a mask.

FIG. 5 illustrates an example of a compressed input video (picture) based on the input video (picture) in FIG. 3 and the ROI indicated in FIG. 4 as a mask. FIG. 5 illustrates an example in which the bit rate can be reduced by 30% through video compression.

Figure 6:
FIG. 6 illustrates an example of a picture taken after performing conventional blurring of the picture in FIG. 3.

FIG. 6 illustrates an example of a picture taken after performing blurring of the video in FIG. 3 according to other conventional pre-treatment methods. In this case, the bit rate of the compressed video may be decreased by 30% due to reduction in video complexity through blurring.

As can be appreciated by comparing FIG. 5 with FIG. 6, the video quality of FIG. 5 is superior to that of FIG. 6. In particular, the goal posts in FIG. 5 are much clearer than the goal posts in FIG. 6. The difference in the two pictures is due to heavy blurring (as in FIG. 6) and a reduced bit rate. A relatively higher bit rate may be necessary to compress a video with heavy blurring while maintaining high video quality.

Figure 7:
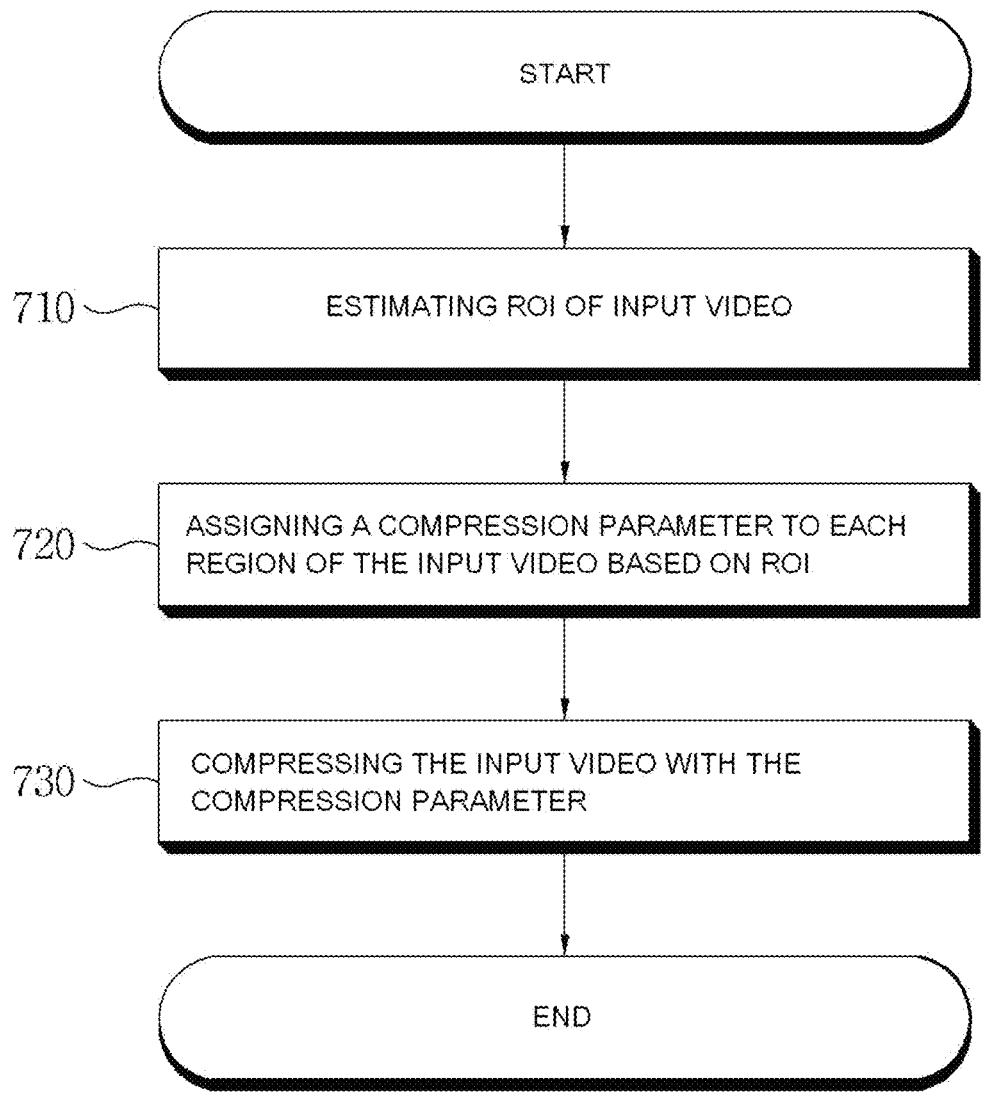
FIG. 7 is a flow chart of the video compression method discussed herein according to exemplary embodiments of the present invention.

FIG. 7 is a flow chart of the video compression method according to exemplary embodiments of the present invention.

Firstly, after receiving an input video, the ROI of the input video may be estimated (S710). The ROI of the input video may be estimated using the ROI Estimating part 110. The estimated ROI result may provide a probability of each pixel of the input video belonging to the ROI, a probability that each macroblock of the input video belongs to the ROI, and/or information associated with regions of the image having a high probability of belonging to the ROI. For example, in some cases, if a region of pixels has a probability greater than a specified threshold, the region of pixels may be designated as belonging to the ROI. In some cases, if a region of pixels has a probability lower than a specified threshold, the region of pixels may be designated as belonging to the ROI.

Next, compression parameters may be assigned to each region of the input video based on the estimated ROI (S720). The compression parameters can be the bit rate, QP, resolution, and/or adjustable parameters of particular video standards.

Next, the input video may be compressed by applying the compression parameters allocated to each region of the input video (S730). The video compression can be performed using any suitable video encoding method. The compression may also be performed after performing pre-treatment.

The video compression method discussed herein may be implemented using software, hardware, or any combination thereof. The video compression method may be performed by a computer, video recording device, and/or video compression device. The video compression method may be executed using any suitable computer program, and may be saved on a computer-readable medium such as, for example, a floppy disk, CD, DVD, RAM, ROM, flashy memory, and/or EEPROM.

Exemplary embodiments of the present invention relate to an apparatus and method that may achieve higher compression rates for video compression by allocating a higher bit rate to regions of a video that attract greater visual interest and a lower bit rate to regions of the video that attract less visual interest.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An apparatus to compress a video comprising pixels, the apparatus comprising:
 a region of interest (ROI) estimating part to estimate ROI information associated with a first ROI in the video;
 a parameter allocating part to allocate a first compression parameter to the first ROI in the video based on the ROI information; and
 a compression part to compress the video by applying the first compression parameter allocated to the first ROI, wherein:
 the ROI information comprises at least one of: a probability that each macroblock of the video belongs to the first ROI; and information associated with regions of the image having a probability of belonging to the first ROI that is greater than a predetermined threshold;
 the first compression parameter comprises at least one of a bit rate and an adjustable parameter provided by a video standard associated with the video; and
 the compression part comprises:
 a pre-treatment part configured to perform a pre-treatment by changing a resolution of the whole video; and
 an encoder configured to compress the video.

2. The apparatus of claim 1, wherein the ROI estimating part estimates the first ROI by analyzing the video and/or by acquiring viewing information associated with a behavior of viewers while watching the video.

3. The apparatus of claim 1, wherein the ROI estimating part estimates ROI information associated with a second ROI in the video, the second ROI being different than the first ROI,
 wherein the parameter allocating part allocates a second compression parameter to the second ROI in the video based on the ROI information associated with the second ROI, and wherein the compression part compresses the video by applying the compression parameter allocated to the second ROI.

4. The apparatus of claim 3, wherein the first compression parameter is the same as the second compression parameter.

5. The apparatus of claim 3, wherein the first compression parameter is different than the second compression parameter.

6. The apparatus of claim 1, wherein the parameter allocating part allocates a non-ROI compression parameter to a non-ROI in the video, the non-ROI compression parameter being different than the first compression parameter.

7. A method to compress a video comprising pixels, comprising:
estimating region of interest (ROI) information associated with a first ROI in the video;
allocating a first compression parameter to the first ROI of the video based on the ROI information; and
compressing the video by applying the first compression parameter allocated to the first ROI,
wherein:
the ROI information comprises at least one of: a probability that each macroblock of the video belongs to the first ROI; and information associated with regions of the image having a probability of belonging to the first ROI that is greater than a predetermined threshold;
the first compression parameter comprises at least one of a bit rate and an adjustable parameter provided by a video standard associated with the video; and
compressing the video comprises:
performing pre-treatment of the video comprising changing a resolution of the whole video; and
compressing the video after the pre-treatment.

8. The method of claim 7, wherein estimating ROI information comprises estimating the first ROI by analyzing the video or observing a viewer watching the video.

9. The method of claim 7, further comprising:
performing the executing, allocating, and compressing on a computer; and
storing an output of the performing in a computer-readable medium.

10. The method of claim 7, further comprising:
estimating ROI information associated with a second ROI in the video;
allocating a second compression parameter to the second ROI of the video based on the ROI information associated with the second ROI; and
compressing the video by applying the second compression parameter allocated to the second ROI.

11. The method of claim 10, wherein the first compression parameter is the same as the second compression parameter.

12. The method of claim 10, wherein the first compression parameter is different than the second compression parameter.

13. The method of claim 7, further comprising:
allocating a non-ROI compression parameter to a non-ROI in the video, the non-ROI compression parameter being different than the first compression parameter.

* * * * *